Figure 1:
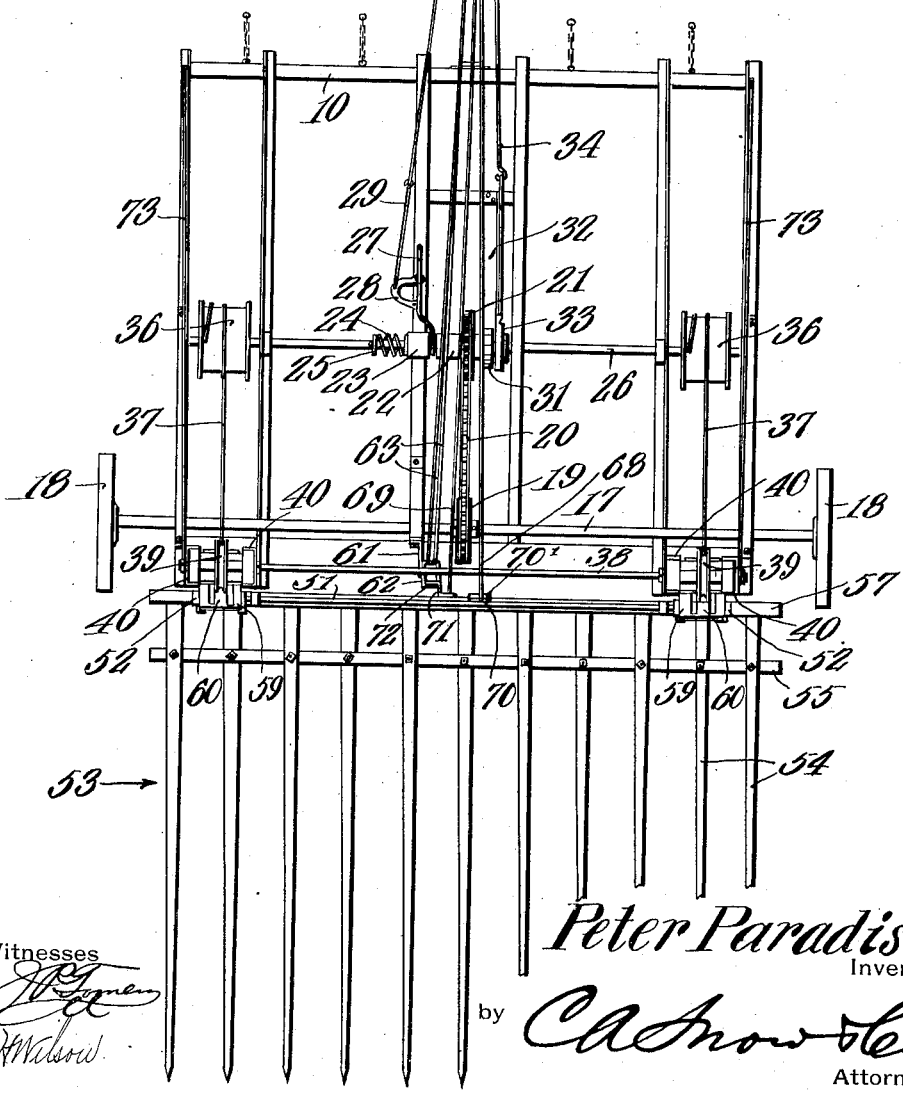

P. PARADISE.
HAY GATHERER AND STACKER.
APPLICATION FILED JULY 2, 1912.

1,094,093.

Patented Apr. 21, 1914.
4 SHEETS—SHEET 1.

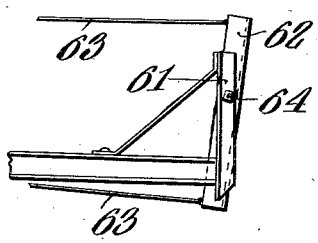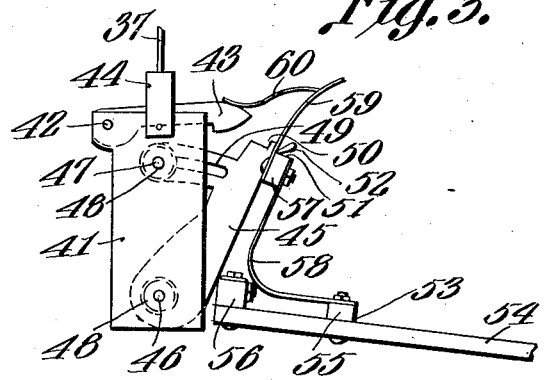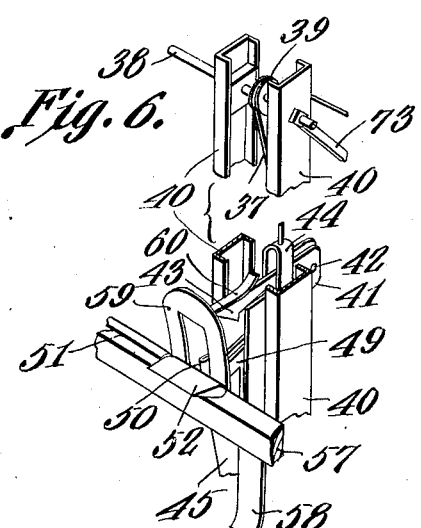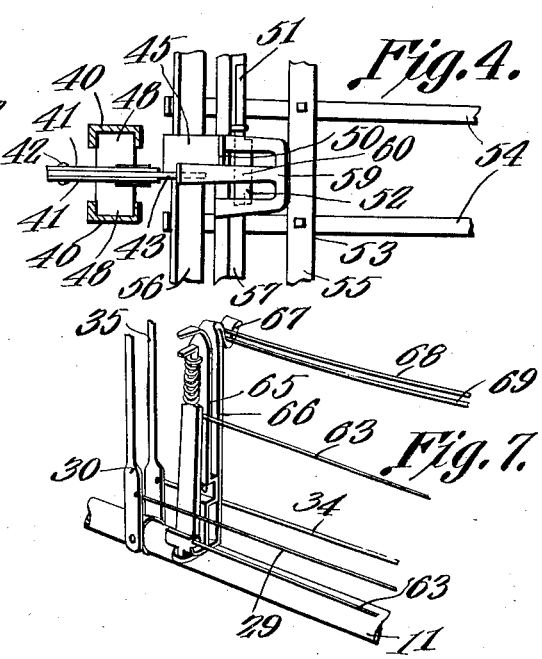

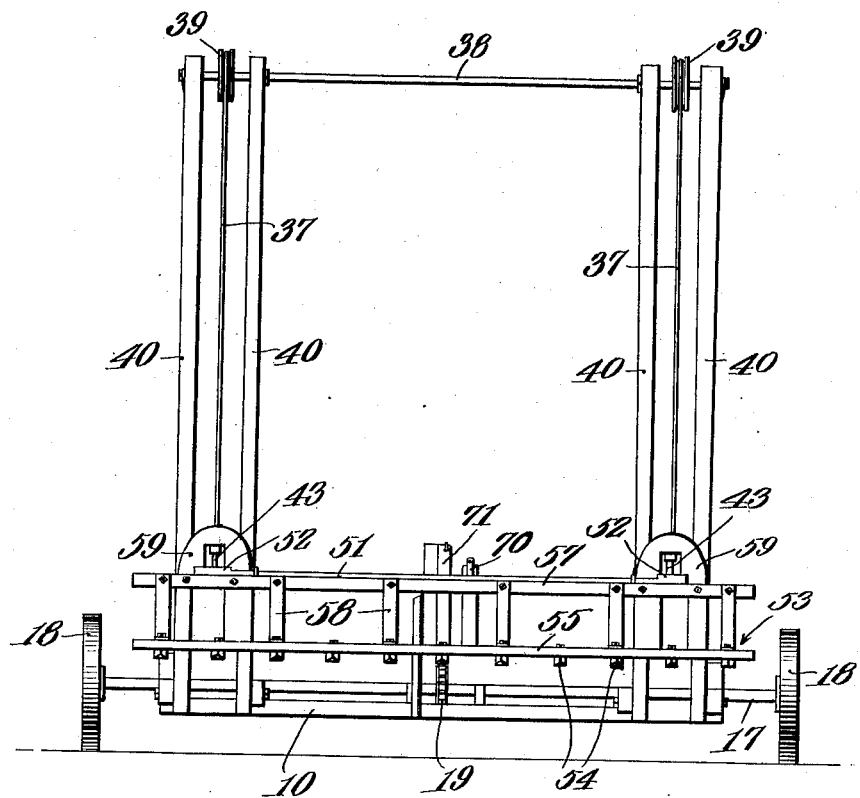

P. PARADISE.
HAY GATHERER AND STACKER.
APPLICATION FILED JULY 2, 1912.
1,094,093.
Patented Apr. 21, 1914.
4 SHEETS—SHEET 4.
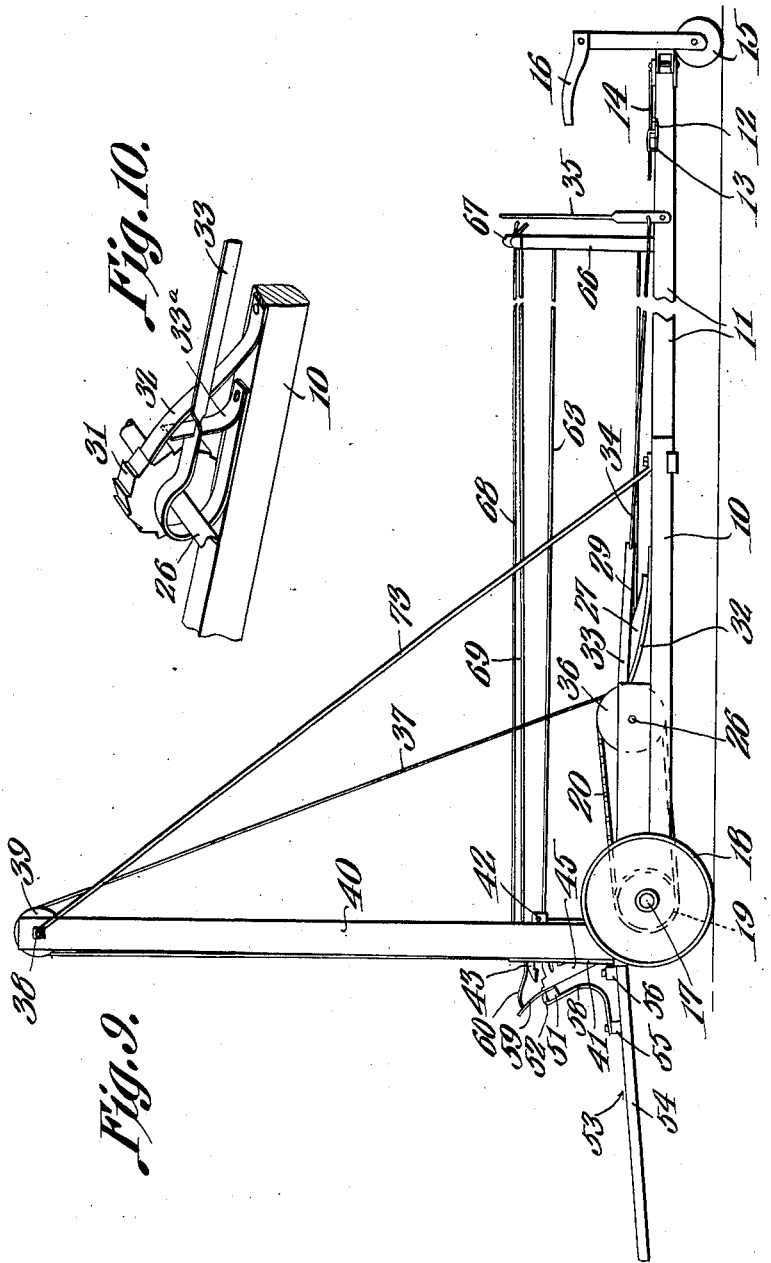
Peter Paradise,
Inventor

UNITED STATES PATENT OFFICE.

PETER PARADISE, OF PRINCETON, CALIFORNIA.

HAY GATHERER AND STACKER.

1,094,093.

Specification of Letters Patent. Patented Apr. 21, 1914.

Application filed July 2, 1912. Serial No. 707,392.

*To all whom it may concern:*

Be it known that I, PETER PARADISE, a citizen of the United States, residing at Princeton, in the county of Colusa and State of California, have invented a new and useful Hay Gatherer and Stacker, of which the following is a specification.

This invention relates to machines for gathering and stacking hay, alfalfa, and other crops, and contemplates the production of a machine of this character which may be driven over the field or meadow to gather the hay or the like in its path, so that the hay or the like may be conveyed to any particular point and then stacked.

The present invention also aims to produce a device of this character wherein the gathered hay may be readily raised so as to be projected over the hay already stacked, and wherein the hay may then be lowered onto the stack.

Another object of the present invention is to provide a machine of this character embodying a wheel-mounted frame and a buck rake vertically adjustable thereon, means connecting the rake and the wheels in order to raise the rake when desired by the movement of the machine, means for swinging the rake to and from the ground or soil when the rake is in its lowermost position, and means for permitting the rake to gravitate after the same has been raised.

A further object of the present invention is the production of a machine of this character adapted to be readily driven over the ground or soil and adapted to be readily operated.

With the foregoing and other objects in view, which will be apparent as the invention is better understood, this invention resides in the novel construction, arrangement and combination of parts hereinafter set forth and particularly pointed out in the appended claims, it being understood that this machine is susceptible of alterations or deviations in its details within the scope of the appended claims without departing from the spirit of the invention.

The invention has been illustrated in its preferred embodiment in the accompanying drawings, wherein similar reference characters have been employed to denote corresponding parts, and wherein—

Figure 1 is a plan view of the machine, parts being broken away. Figs. 2 and 3 are fragmental elevations of details. Fig. 4 is a plan view of the detail shown in Fig. 3, parts being removed. Figs. 5, 6 and 7 are fragmental perspectives of details. Fig. 8 is a front view of the machine. Fig. 9 is a side elevation thereof. Fig. 10 is a fragmental detail in perspective.

Referring specifically to the drawings, the numeral 10 designates the frame of the machine, which is mounted on a rotating axle 17, the axle being arranged adjacent the forward end of the frame, and the wheels 18 are attached on the ends of the axle. These wheels 18 are attached to the ends of the axle 17 by any suitable means, the details of which need not be shown or described, so that the wheels may have a reverse rotation on the axle 17 in order to permit the machine to be readily steered. However, when the wheels 18 are rotated in the proper direction, as when the machine is moving forwardly, the axle 17 is caused to rotate therewith, the differential just referred to permitting either wheel to move slower than the other without impairing the movement of the axle, for convenience in steering, as above indicated. A push beam 11 is attached to the rear end of the frame 10, and at its rear end carries a caster or trailer wheel 15 which has a handle 16 for convenience in turning same so as to steer the machine. A platform 14 is secured on the rear end of the push beam 11, and a whiffle-tree 12 is also secured to the rear end of the push beam 11 underneath the platform 14, this whiffle-tree 12 having a plurality of swingle trees 13 attached thereto. These swingle trees 13 are designed for the attachment of horses or other draft animals in order to drive the machine, but it is understood that this machine may be motor-driven if desired.

A pair of channel iron masts 40 are secured to the forward end of the frame 10 at each side thereof, the respective channel iron masts of each pair having their flanges disposed toward each other or inwardly and being spaced apart so as to provide vertical guides. A carriage is mounted to slide along each guide between the channel iron masts 40, each of these carriages comprising a pair of spaced plates 41 having upper and lower axles 47 and 46 passing therethrough, and wheels or rollers 48 mounted on the ends of the axles and working in the channel iron masts 40. A latch 43 is pivoted between the plates 41 of each carriage by means of the pin or rivet 42, and an arm 45 is pivoted between the lower ends of the plates 41 of each carriage on the lower axle 46, this arm having a slotted arcuate extension 49 engaging the upper axle 47. The latch 43 is pivoted between the upper ends of the plates 41 at the rear edge of the plate and projects forwardly beyond the forward edges of the plates, and the arm 45 projects beyond the forward edges of the plates and is adapted to swing to and from the forward edges of the plates in order that the upper end 50 of the arm may be engaged by the latch 43 when the arm is raised to its fullest extent.

The buck rake has been designated generally by the numeral 53 and comprises the teeth 54 which have the spaced cross bars 55 and 56 secured to the butt ends thereof, the cross bar 56 being arranged outermost or along the rear or butt ends of the teeth. The cross bar 56 of the rake is secured to the two arms 45 in order to pivotally connect the rake with the carriages, and a cross bar 57 is secured to the upper or free ends of the arms 45. A plurality of bowed strips 58 are secured at their ends to the cross bars 55 and 57 in order to provide a guard at the rear or butt end of the rake to prevent the hay or the like from passing over the rear end of the rake. In this manner, the buck rake is carried by the carriages in order to be raised and lowered with the carriages.

A plate 59 is secured to the cross bar 57 adjacent each of the arms 45, and has a resilient tongue or leaf spring 60 struck therefrom and engaging the upper side of a corresponding latch 43 in order to give a downward tension to the latch. Thus when the arms 45 are swung upwardly so as to swing the buck rake upwardly to its fullest extent, the latches 43 are snapped into engagement with the upper ends 50 of the arms 45, the tongues or spring 60 sliding along the upper sides or edges of the latches 43. A rock shaft 51 is journaled on the cross bar 57 and at its ends has the cams or wipers 52, which when the said rock shaft is swung in the proper direction, are adapted to lift the latches 43 out of engagement with the arms 45 so as to permit the buck rake to swing downwardly by its own gravitation. This rock shaft 51 is actuated by means of a cable or other flexible member 68 attached to an arm 70 upstanding from the central portion of the said shaft, and a leaf spring 70' which is secured to the cross bars 56 and 57 engages the arm 70 to normally swing the rock shaft 51 so that the cams or wipers 52 will not engage the latches 43 when the rake is raised. Thus when the rake is raised to its fullest extent so that the latches 43 are engaged to the arms 45, the latches may be released or disengaged by pulling the cable 68 which will swing the rock shaft in order to bring the cams or wipers 52 into engagement with the latches as above indicated.

A transverse shaft 26 is journaled in the frame 10 and carries a drum 36 arranged adjacent each end thereof. This shaft 26 has a loose sprocket wheel 21 mounted thereon and the axle 17 has a corresponding sprocket 19 secured rigidly thereon, a chain 20 being trained around the sprockets 19 and 21 in order that the sprocket 21 will rotate with the wheels 18 of the machine. A sprocket 21 is provided with a clutch hub 22, and a clutch member 23 is slidably mounted on the shaft 26, but constrained against rotation relative thereto, and is adapted to coöperate with the clutch hub 22 so that when the clutch member 23 is engaged to the clutch hub 22, the shaft 26 is made to rotate with the sprocket 21. A coiled wire compression spring 24 is arranged on the shaft 26 between the clutch member 23 and the collar 25 fixed on the shaft in order to normally force the clutch member 23 toward the clutch hub 22. A lever 27 is pivoted to the frame 10 and has the free end thereof engaging the clutch member 23, and a second or supplemental lever 28 is also pivoted to the frame 10 and has the free end thereof connected to the lever 27, so that when the lever 28 is swung, the lever 27 will be swung therewith in order to disengage the clutch member 23 from the clutch hub 22 against the tension of the spring 24. The lever 28 is swung by means of a cable or other flexible member 29 attached thereto. A ratchet wheel 31 is also secured to the shaft 26 and a spring pawl 32 is secured to the frame 10 and engages the ratchet wheel 31 in order to prevent the reverse rotation of the shaft. This pawl 32 is adapted to be disengaged from the ratchet wheel 31 by any suitable means mounted on the frame 10.

The pawl releasing means consists in a metallic strap 23 secured to the frame 10 and looped around the shaft 26, and a flexible arm 33ª secured to the frame and having its upper or free end standing below the pawl 32, the strap 33 engaging the arm 33ª. The strap 33 is resilient, and when the free or rear end thereof is drawn rearwardly, the arm 33ª will be swung rearwardly so as to raise the pawl 32 out of engagement with the ratchet wheel 31. The pawl releasing means is actuated by means of a cable or other flexible member 34 secured to the rear or free end of the strap 33, so that when the cable 34 is pulled, the pawl or dog 32 may be raised out of engagement with the ratchet wheel 31 permitting the shaft to have a reverse rotation.

A cross rod 38 passes through the upper end of each pair of the masts 40 to connect the masts together, and a pulley wheel or sheave 39 is mounted on the cross rod 38 between each pair of masts 40 or within each guide.

Cables 37 are attached to the drums 36 and are trained over the pulley wheels or sheaves 39 and have their free ends attached to the plates 41 of the carriages by means of clevises 44. It will therefore follow that when the shaft 26 is rotated, the cables 37 will be wound upon the drums 36, which will cause the carriages to be raised along the guides in order to elevate the buck rake 53.

A short upright 61 is carried by the front end of the frame 10 and has an oscillating member 62 pivoted thereto by means of a bolt 64, cables 63 being attached to the upper and lower ends of the oscillating member 62 in order to actuate same. The member 71 is attached to the cross bars 56 and 57 of the buck rake and has an upper ear 72, which is adapted to engage in the upper end of the oscillating member 62 when the buck rake is in its lowermost position. A standard 66 is carried by the rear end of the push beam 11 adjacent the platform 14, and a lever 65 is pivoted thereto, the cables 63 connected to the oscillating member 62 being attached to the lever 65 above and below the fulcrum thereof, so that when the lever 65 is swung, the oscillating member 62 will be correspondingly swung. When the member 62 is oscillated or swung, the ear 72 being in engagement therewith will cause the buck rake to swing with the said member 62, so that the operator standing on the platform 14 may control the movement of the buck rake by means of the lever 65, when the buck rake is in its lowermost position. In this manner, the buck rake may be swung to and from the ground or soil in order to collect or gather the hay or to escape objects or obstructions. A cable 69 is also attached to the member 71 for the purpose of swinging the buck rake upward independent of the oscillating means for the rake. Thus when or before the buck rake is elevated, by pulling the cable 69, the buck rake may be swung upward, and when swung upward to its fullest extent will cause the upper ends 50 of the arms 45 to be engaged by the latches 43 in order to lock or retain the buck rake in such position.

The standard 66 attached to the rear end of the push beam 11 has an upper crotch 67 which is adapted to receive the rear or free ends of the cables 68 and 69 in order that the ends of the cables may be readily grasped by the operator on the platform 14. A pair of levers 30 and 35 are pivoted to the push beam 11 adjacent the standard 66 and adjacent the platform 14, the respective cables 29 and 34 being attached to the said levers, so that when the respective levers 30 and 35 are swung, the clutch member 23 may be actuated and the pawl or dog 32 may be disengaged from the ratchet wheel 31.

Braces 73 are attached to the extremities of the cross bar 38 and to the rear end of the frame 10 in order to brace the vertical guides.

In operation, the machine is driven by means of horses or other draft animals attached to the swingletrees 13 in rear of the frame 10, an operator standing on the platform 14 so that he may steer the machine by actuating the handle or lever 16 attached to the trailer or caster wheel 15. As the machine is driven to the point where the hay is to be collected or gathered, the buck rake 53 is preferably swung upward by means of the lever 65 so as to free the soil, and when the point of gathering has been reached, the rake may be swung downward toward the soil by swinging the lever 65 in the proper direction and thus permitting the hay to be engaged and taken up by the buck rake 53. The operator may by the manipulation of the lever 65 control the position of the buck rake in order to properly gather the hay and escape obstruction on the soil. In this manner, the hay may be readily gathered from the field, or gathered from windrows, and when sufficient hay has accumulated on the rake, the rake may be swung upward away from the soil by means of the cable 69 so that the latches 43 engage the arms 45 to lock or retain the rake in position when swung upward to its fullest extent. The machine is then driven to the stack, and just prior to reaching the stack, the operator may liberate the clutch member 23 to permit same to engage the clutch hub 22 of the sprocket 21, which will cause the shaft 26 to rotate in order to wind the cables 37 on the drums 36. This will cause the carriages to be elevated or raised in order to carry the buck rake upward. It is understood, that in the operation of the machine, the clutch member 23 is normally held out of engagement with the clutch hub 22 of the sprocket 21 so that the sprocket 21 may rotate as the machine is being driven about without actuating the shaft 26. Thus by engaging the clutch member 23 with the clutch hub 22, the carriages may be raised in order to elevate the buck rake a sufficient amount to pass readily over the stack. When the buck rake has been elevated a sufficient amount, the clutch member 23 is again disengaged from the clutch hub 22 by swinging the lever 30 in the proper direction, the shaft 26 being prevented from reverse rotation by means of the pawl or dog 32 which engages the ratchet wheel 31, and in this manner the buck rake will be retained in elevated position. The machine is then driven toward the stack so that the buck rake passes over the stack, and then by pulling the cable 68, the cams or wipers 52 will disengage the latches 43 from the arms 45 so that the rake 53 may swing downwardly upon the stack. The machine is then backed away from the stack which will cause the rake to be withdrawn leaving the hay on the rake to drop in position on the stack. When the machine has been backed sufficiently away from the stack, the pawl or dog 32 may be disengaged from the ratchet wheel 31 which will permit the rake to gravitate, and when the ear 72 has again engaged the oscillating member 62, the machine is again ready to gather more hay.

In the foregoing manner, the hay, alfalfa or other crops may be readily gathered from the field and stacked at any desired point, and the machine may be driven toward the stack from various sides so as to properly stack the hay or the like. This machine may be operated by two men in a convenient and practical manner, and the hay or other crops may be readily gathered without shaking the best or fine feed onto the ground or soil, thus permitting the fine feed to be gathered with the coarser feed, which is highly desirable and providing a higher grade of hay or alfalfa.

This machine may be constructed in its details of any suitable material, and this machine is otherwise susceptible of numerous alterations or deviations in its details within the scope of the appended claims without departing from the spirit of the invention.

Having described the invention, what is claimed as new is:—

1. A gatherer and stacker embodying a wheel mounted frame, vertical guides carried thereby, a buck rake slidably and swingably carried by the guides, means for raising the rake, oscillating means carried by the frame, the rake being engaged by the oscillating means when in its lowermost position so that the rake may be positively swung to and from the ground and being disengaged therefrom when raised, means for swinging the rake upward independent of the oscillating means, means for locking the rake when swung upward by the last mentioned means, and means for releasing the locking means.

2. A gatherer and stacker embodying a wheel mounted frame, vertical guides carried thereby, a buck rake slidably and swingably carried by the guides, means for raising the rake, oscillating means carried by the frame, the rake being engaged by the oscillating means when in its lowermost position so that the rake may be positively swung to and from the ground and being disengaged therefrom when raised so that the rake is free from the said oscillating means, and independent means for manipulating the rake.

3. A gatherer and stacker embodying a wheel mounted frame, vertical guides carried thereby, carriages slidable along the guides, a buck rake pivoted to the carriages, means for raising the carriages, oscillating means carried by the frame, the rake being engaged by the oscillating means when in its lowermost position so that the rake may be positively swung to and from the ground and being disengageable therefrom when raised, means for swinging the rake upward independent of the oscillating means, coöperating means carried by the rake and said carriages for locking the rake when swung upward by the last mentioned means, and means for releasing the locking means.

In testimony that I claim the foregoing as my own, I have hereto affixed my signature in the presence of two witnesses.

PETER PARADISE.

Witnesses:
HENRY QUINT,
GEO. COOK.

---

Copies of this patent may be obtained for five cents each, by addressing the "Commissioner of Patents, Washington, D. C."